US010594000B2

(12) United States Patent
Hinterberger et al.

(10) Patent No.: US 10,594,000 B2
(45) Date of Patent: Mar. 17, 2020

(54) BATTERY CELL FOR A BATTERY OF A MOTOR VEHICLE, BATTERY, AND MOTOR VEHICLE

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 49 days.

(21) Appl. No.: 15/548,203

(22) PCT Filed: Feb. 11, 2016

(86) PCT No.: PCT/EP2016/052944
§ 371 (c)(1),
(2) Date: Aug. 2, 2017

(87) PCT Pub. No.: WO2016/131709
PCT Pub. Date: Aug. 25, 2016

(65) Prior Publication Data
US 2018/0019503 A1  Jan. 18, 2018

(30) Foreign Application Priority Data
Feb. 18, 2015  (DE) .................. 10 2015 002 078

(51) Int. Cl.
*H01M 10/42* (2006.01)
*H01M 10/48* (2006.01)

(52) U.S. Cl.
CPC ......... *H01M 10/425* (2013.01); *H01M 10/48* (2013.01); *H01M 10/482* (2013.01); *H01M 10/486* (2013.01); *H01M 2010/4278* (2013.01); *H01M 2220/20* (2013.01)

(58) Field of Classification Search
CPC ........... G01R 31/3606; G01R 31/3686; G01R 31/3689; H04Q 9/00; H04Q 2209/75; H04Q 2209/883; H04B 2203/5445; H04B 2203/5458
See application file for complete search history.

(56) References Cited

U.S. PATENT DOCUMENTS

| | | | |
|---|---|---|---|
| 2012/0256492 A1 | 10/2012 | Song et al. | |
| 2013/0249317 A1 | 9/2013 | Kang et al. | |
| 2014/0265550 A1 | 9/2014 | Milligan et al. | |

FOREIGN PATENT DOCUMENTS

| | | |
|---|---|---|
| CN | 1399725 A | 2/2003 |
| CN | 103210317 A | 7/2013 |
| CN | 204156045 U | 2/2015 |
| DE | 102010011740 A1 | 9/2011 |
| DE | 102012202079 A1 | 8/2013 |
| DE | 102013005684 A1 | 10/2014 |
| JP | 2006-506787 A | 2/2006 |
| KR | 10-2012-0075398 A | 7/2012 |
| WO | 2004/047215 A1 | 6/2004 |
| WO | 2012/034045 A1 | 3/2012 |

OTHER PUBLICATIONS

Notification of Transmittal of Translation of the International Preliminary Report on Patentability dated Aug. 31, 2017, in connection with corresponding international application No. PCT/EP2016/052944 (10 pages).
Examination Report dated Dec. 10, 2015 of corresponding German application No. 102015002078.1; 5 pgs.
International Search Report dated Apr. 20, 2016 of corresponding International application No. PCT/EP2016/052944; 14 pgs.
Chinese Office Action dated Jan. 4, 2019, in connection with corresponding CN Application No. 201680010665.8 (16 pgs., including machine-generated English translation).
Korean Office Action dated Oct. 15, 2018, in connection with corresponding KR Application No. 10-2017-7026267 (13 pgs., including machine-generated English translation).

*Primary Examiner* — Ladan Mohaddes
(74) *Attorney, Agent, or Firm* — Maier & Maier, PLLC

(57) ABSTRACT

A battery cell for a battery of a motor vehicle with a galvanic element, a battery cell housing, at least two sensor devices for detecting a physical and/or chemical property of the battery cell and a communication device, wherein the galvanic element is arranged inside a battery cell housing. The first sensor device and the communication device are coupled via a first signal path for transmitting signals between the first sensor device and the communication device for transmitting signals between the first sensor device and the communication device, and the first sensor device and the second sensor device are coupled via a second signal path for transmitting signals between the first and the second sensor device.

10 Claims, 2 Drawing Sheets

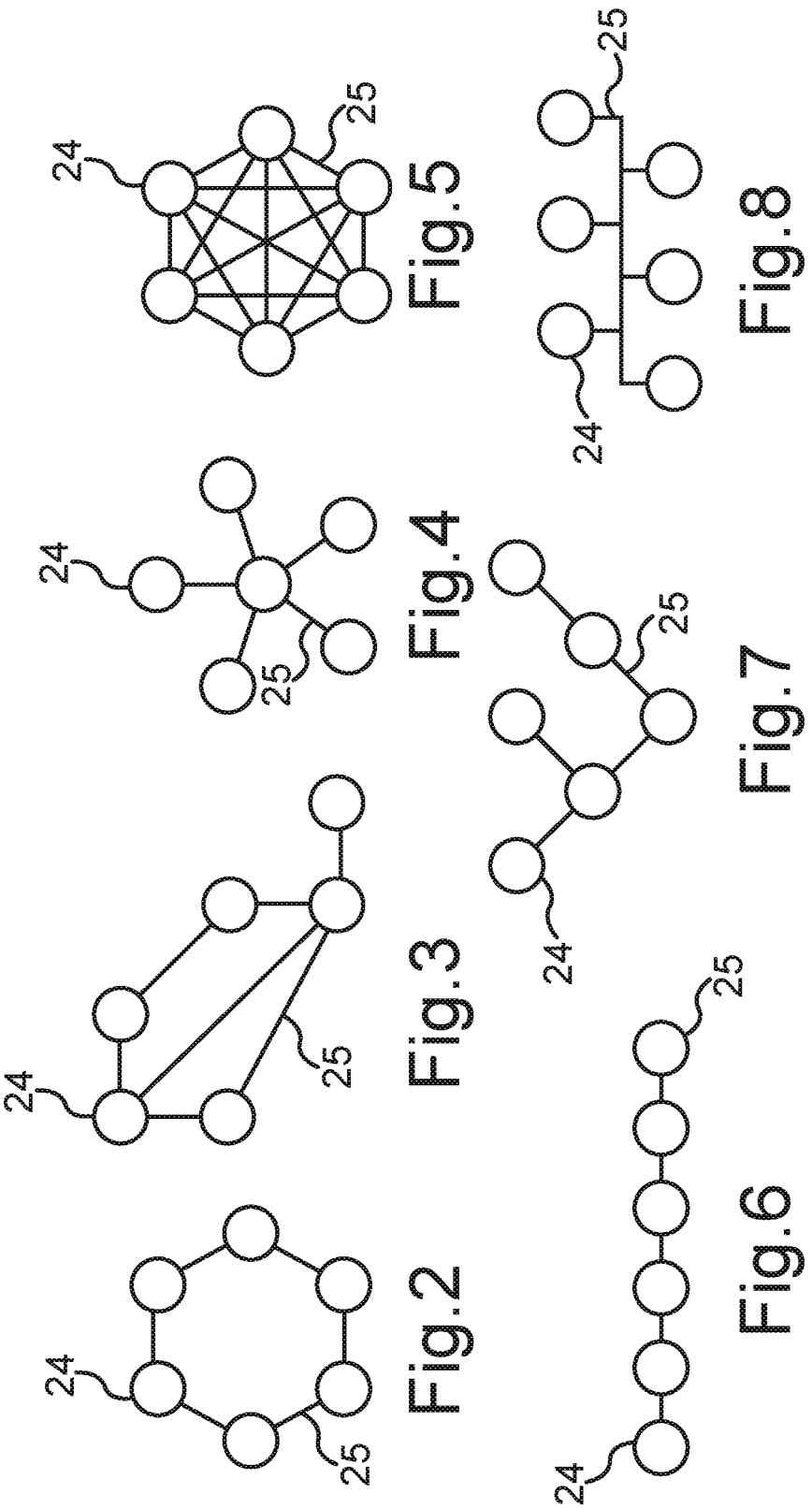

BATTERY CELL FOR A BATTERY OF A MOTOR VEHICLE, BATTERY, AND MOTOR VEHICLE

FIELD

The invention relates to a battery cell for a battery of a motor vehicle provided with a galvanic element, a battery cell housing, at least two sensor devices for detecting a physical and/or chemical property of the battery cell and a communication device, wherein the galvanic element is arranged inside the battery housing. The invention also relates to a battery and a motor vehicle.

BACKGROUND

In the case of known battery cells, a galvanic element is usually arranged in a battery cell housing. In order to provide a specific voltage or a specific current, several battery cells can be connected together in a batter. These batteries are nowadays used in particular as traction batteries in motor vehicles, for example in electric vehicles or in hybrid motor vehicles, in order to drive motor vehicles. However, certain requirements must be met when the batteries are used in motor vehicles. Since the traction batteries can provide the voltage of several hundred volts, special security measures must be taken, for example in order to prevent a hazard to people. In addition, a high availability of the batteries must be ensured. This availability is in particular dependant on a degree of damage caused to the battery or on aging of the battery. Since the battery cells are characterized by fluctuations due to manufacturing reasons with respect to their capacitance as well as with respect to their internal resistance, they are generally charged and discharged with different speeds. This can result in damaging the battery, for example when individual battery cells are deeply discharged or overcharged.

Several techniques are known from prior art for monitoring a battery or individual battery cells. So for example DE 10 2010 011 740 A1 discloses a battery in which a state of the individual battery cells is detected by sensors and wirelessly transmitted to a superordinate central unit. In WO 2012/034045 A1 is described a battery monitoring system wherein a measuring device is mounted on or in a battery cell. Also, the WO 2004/047215 discloses a battery management system wherein the physical properties of the battery are monitored in order to extend the lifespan of the battery.

SUMMARY OF THE DISCLOSURE

The object of the present invention is to provide a solution by means of which a particularly reliable signal exchange is enabled between the components of a battery cell.

This object is achieved according to the invention with a battery cell, a battery and a motor vehicle having the features according to the independent patent claims. Preferred embodiments of the invention are the subject of the independent patent claims, the description and the figures.

A battery cell according to the invention for a battery of a motor vehicle comprises a galvanic element, a battery cell housing, at least two sensor devices for detecting a physical and/or chemical property of the battery cell and a communication device, wherein the galvanic element is arranged inside the battery cell housing.

In addition, the first sensor device and communication device are coupled via a first signal path for transmitting signals between the first sensor device and the communication device, and the first sensor device and the second sensor device are coupled via a second signal path for transmitting signals between the first and the second sensor device. In this case, the signals can be exchanged between the communication device and the second sensor device via a third signal path formed by the first and the second signal path.

The galvanic element is in particular designed as a secondary cell, which can be discharged for supplying electric components and then recharged again after discharging. The galvanic element comprises in this case two electrodes and an electrolyte in a known manner. The galvanic element is arranged in the battery cell housing. The battery cell housing can be designed as an aluminum housing consisting of two parts, wherein the two parts can be welded together in a "gas-tight" manner after the integration of the galvanic elements or of the battery cell wrapping. At the same time, the galvanic element can be insulated from the battery cell housing. For this purpose, an insulating material can be arranged for example between the inner side of the wall of the battery cell housing and the galvanic element. In order to supply to electric components electric voltage that is provided from the battery cells and/or to charge the battery cell and/or to connect the battery cell to another battery cell, the battery cell housing is in this case provided with two battery poles, particularly exposed battery poles or battery connections, wherein each battery pole is electrically connected to an electrode of the galvanic element.

The sensor devices are used to detect physical and/or chemical properties of the battery cells. The sensor devices or sensors can be designed as so-called micro-electromechanical systems (MEMS). The sensors can be designed for example at least in the form of the following sensors: vibration sensor, acceleration sensor, gyroscope, temperature sensor, force sensor, pressure sensor, bending sensor, extension sensor, displacement sensor, inclination sensor, distance sensor, proximity sensor, optical sensor such as for example an optosensor, light sensor, UV sensor, color sensor, IR sensor, in particular an NDIR (non-dispersive infrared) sensor, spectrum sensor, sensor for measurement of the electrolyte filling level, sensor for measurement of conductivity, for example for measuring the conductivity of electrolytes, sensor for detection of particles to prove movements of free molecules, atoms or element particles, sensor for measurement of current, magnetic field sensor, Hall effect sensor, sensor for measurement of voltage, gas sensor, for example for the composition of gases within the battery cell, electrochemical sensor, for example for the chemical composition of electrolytes or gases, pH sensor, ultrasound sensor, inductive sensor for high-precision measurement, piezoelectric sensor or photoelectric sensor. In addition, a sensor for detecting insulation resistance or for testing the insulation between the battery cell housing and the galvanic element can be also provided. Such a sensor can be also referred to as an insulation monitor. The safety or a state that is free of errors of the battery cell can thus be detected in this manner. The sensor devices can be arranged inside or outside of the battery cell housing.

The communication device can be provided with a control device and it can be designed for bidirectional communication with the sensor devices. For this purpose, the sensor data that was detected as signals by the sensor devices is transmitted to the communication device and received by the device. The communication device can send control signals to the sensor device. It can be also provided that the communication device can communicate with a superordinate battery management system and/or a communication device of another battery cell, for example via a wireless connection. The communication device can in this case be arranged inside the battery cell housing, but it can be also arranged outside of the battery cell housing.

In other words, with a battery cell according to the invention, it is provided that the first sensor device and the communication device are network nodes of a network topology, for example of a meshed node, wherein the communication device is the central network node or a communication node. In other words, this means that each of the sensor devices can communicate and exchange bidirectional signals with the communication device. At the same time, the communication device can communicate via the first signal path directly, which is to say via a signal path which leads through another network node, with the first sensor device. The communication device can communicate with the second sensor device indirectly, which is to say via a third signal path which leads through the first sensor device. In addition, the first and the second sensor device can communicate with each other through the second signal path.

The communication or the exchange of signals can in this case be conducted continuously or in defined time intervals. However, it can be also provided that signals are exchanged for example only when a predetermined threshold value is exceeds. For example, it can be provided that sensor devices that are designed as temperature sensors will transmit a signal via the respective signal path to the communication device only when the detected temperature exceeds a predetermined maximum value temperature.

With the networking of the sensor devices and of the communication devices is thus formed a so-called intelligent network or a smart mesh, by means of which the communication device can be informed in an advantageous manner as a superordinate network node about the status of each of the sensor devices. At the same time, it is not necessarily required for each communication device to communicate via a direct signal path with each sensor device. In other words, this means that the sensor devices can function as a so-called router, wherein the sensor device which is coupled via a direct signal path to the communication device thus represents a coupling member between the communication device and another sensor device that can forward the signal to another sensor device. In this manner it is possible for example in the simplest case to arrange all sensor devices in a chain which has the communication device arranged at its end.

The signal of a sensor device that was arranged at the beginning of the chain can be forwarded from the sensor device through all the following sensor devices to the communication device.

A particularly flexible communication network is thus provided with the option to create a router function of the individual sensor device, which can be expanded as required with further network nodes, for example in the form of sensor devices. When for example it is not possible to establish a direct signal path between two network nodes, for example for reasons relating to space, inside the battery housing, an indirect signal path can be provided in an advantageous manner via another network node.

It is particularly preferred when the communication devices and the second sensor device are coupled via at least a fourth signal path for transmitting signal between the second sensor device and the communication device, wherein signals can be transmitted between the second sensor device and the communication device via the third signal path and/or via at least one fourth signal path. The network comprising at least two sensor devices and the communication device is then designed as a so-called full mesh network. With the full mesh network, all network nodes can communicate with each other via a direct signal path and via at least one indirect signal path. Here, the second sensor device and the communication device can communicate with each other directly and/or indirectly through the third signal path. The first sensor device and the communication device can communicate with each other via the first signal path directly and/or via the second and the fourth signal path indirectly. A network that is designed as a full mesh network is designed in a particularly safe manner due to redundancy, because at least two signal paths are provided are provided for signal transmission between the individual network paths. In addition, a particularly high network availability can be provided with a very low power consumption.

According to a further development of the invention, the sensor devices that are designed as network nodes and the communication device are each provided with an energy conversion device which is configured to provide electric energy from a signal transmitted by another network node to supply power for the respective network node. All signals have designated physical variables which carry information about one or several parameters. The energy conversion devices are therefore further configured to use the physical variables of the received signals to supply power for the respective power nodes. For this purpose, the energy conversion device is in particular configured to convert a non-electric physical variable into an electric variable. This is also referred to as energy harvesting. In the present case this means that that not only information, but also energy can be transmitted in an advantageous manner in order to supply energy via the signal paths.

With an electric signal which is provided with a current magnitude or with a voltage as a physical variable and in which the information transports for example a frequency or a phase of the current magnitude or voltage, the energy conversion devices are designed so as to provide the current magnitude or the voltage of the received signal in order to provide energy to the respective networks. With an optical signal which is provided with a physical variable in the form of a light wave, the energy conversion devices that are designed as solar sensor are configured to convert the light waves into electric energy to be supplied to the network nodes. With a signal in which information is transmitted inductively by means of RFID (radio frequency identification) to a network node, the magnetic wave can be converted for example with an energy conversion device designed as a receiver coil to electric voltage to be provided to the respective network nodes.

Therefore, the signal transmitted in an advantageous manner via the respective signal path can be used both for energy exchange as well as for exchange of information. Electric energy does not need to be supplied in this case to the network nodes by the galvanic element itself.

Alternatively or additionally, the battery cell is provided with an energy supply device for supplying energy to at least two sensor devices. In this case, the first sensor device and the energy supply device are coupled via a first energy flow path for transmitting energy from the energy supply device to the first sensor device, and the first and the second sensor device are coupled vie a second energy flow path for transmitting energy from the first sensor device to the second sensor device. In this case, the energy can be transmitted to the second sensor device via a third energy flow path formed with the first and the second energy flow path. The sensor devices and the energy supply device thus also form a network whose network topology can be created in the way that was already described in connection with the network comprising the sensor device and the communication device for exchanging signals. Energy can therefore be supplied via the first energy flow path directly to the first sensor device. The second sensor device can supply energy indirectly via the third energy flow path, which leads through the first sensor device. In this case, the first sensor device functions as an intermediate energy storage device for intermediate storage of energy from the energy storage device that is provided for the second sensor device. It is also possible that the communication device is supplied with energy from the energy storage device. By providing the energy supply device as well as the network with the network node, the energy can be provided centrally. It is therefore not necessary for each individual network node to be provided with an energy supply device, such as for example a separate battery.

It is preferred when at least a fourth energy flow path is formed between the energy supply device and the second sensor device, wherein energy can be transmitted via the third energy flow path from the energy supply device to the second sensor device. In other words, this means that each sensor device is designed as an intermediate energy storage device for the energy that is provided from the energy supply device for another sensor device. In this case it can be for example provided so that for each sensor device is calculated a path that is most advantageous in terms of supplying energy for each sensor device from the energy supply device to each respective sensor device. Thereupon it can be also provided that the sensor device is either supplied energy via a direct energy flow path, or via an indirect energy flow path with the energy that is provided from the energy supply device. The advantage here is that the network is designed in particular as an energy efficient network.

According to another embodiment of the invention, a line is provided for at least one energy flow path and/or at least one signal path for a wired transmission of energy and/or of signals. Such a line can be for example an electric line for transmission of energy and/or signals in the form of electric current and electric voltage. Such an electric line can be designed for example as flexible conductors through which the network nodes are mutually connected to each other within the battery cell housing. However, it can also be provided that the lines are designed as glass fibers or as optical waveguides for transmission of optical variables, for example light waves.

Conductors that are designed as optical waveguides enable a particularly fast exchange of signals between the network nodes. If for example the networks are arranged partially inside and partially outside of the battery cell housing, the battery cell housing may be provided with through-leads for the lines.

Alternatively or additionally, at least one energy flow path and/or at least one signal path is configured for contactless transmission of the energy and/or of the signals in the form of light waves. Signal and/or energy can be transmitted for example in the form of light flashes, which are emitted from a network node and/or energy supply device and received by another network node. With a battery cell housing made of optically reflective material, for example aluminum, the light flashes can be reflected in an advantageous manner to an inner side of the wall of the battery cell housing, distributed in the interior of the battery cell housing and provided to other network nodes, which are equipped for example with a solar sensor. However, signals and/or energy can be also transmitted for example inductively.

A battery cell housing made of an electrically conductive material behaves like a Faraday cage. This means that the battery cell housing forms a casing that is closed on all sides from an electric conductor, for example a sheet metal or a wire mesh which acts as an electric shield. With external static or quasi-static fields, the inner region remains at a zero field. In the case of processes that are variable in time such as electromagnetic waves, the shielding effect is based on eddy currents forming in the conductive envelope, which counteract the external electromagnetic field. Due to this fact, in particular an electromagnetic signal path, for example with WLAN communication, can be almost completely shielded from the environment outside of the battery cell housing. The battery cell is thus provided with a particularly high electromagnetic compatibility.

According to another embodiment of the invention, the network nodes and/or the energy supply device are coupled with the battery cell housing in order to transmit energy and/or signals in the form of sound waves to the battery cell housing and to receive sound waves transmitted from the battery cell housing. For this purpose, the network nodes and/or the energy supply device can be provided for example with a vibration actuator which generates excitation in the form of a sound wave on the battery cell housing. This sound wave is further conducted via the battery cell housing and it can be received for example by a vibration sensor of another network node. By using the battery cell housing, separate lines can be omitted in an advantageous manner. The sound wave can be converted to supply energy based on the piezoelectric effect and/or information that is transmitted by the sound wave can be extracted.

The invention also relates to a battery comprising a connection in series and/a parallel connection of at least two battery cells according to the invention.

A motor vehicle according to the invention comprises at least one battery according to the invention. The motor vehicle can be configured for example as a personal automobile, in particular as an electric or hybrid motor vehicle. However, the motor vehicle can be also designed as an electrically operated motorcycle or bicycle.

Moreover, it is further also possible to provide the battery in a stationary energy storage system. In this case, it can be for example provided that the battery, which was provided in a motor vehicle, is further used as a so-called second life battery in the stationary energy storage system.

The battery cell provided in the preferred embodiment and its advantages apply correspondingly to the battery of the invention as well as to the motor vehicle according to the invention.

BRIEF DESCRIPTION OF THE DRAWING

The invention will now be explained in more detail with reference to a preferred embodiment thereof based on the attached figures.

The figures show the following:

FIG. 2-FIG. 8 examples of such a network topology and other network typologies.

Figure 1:
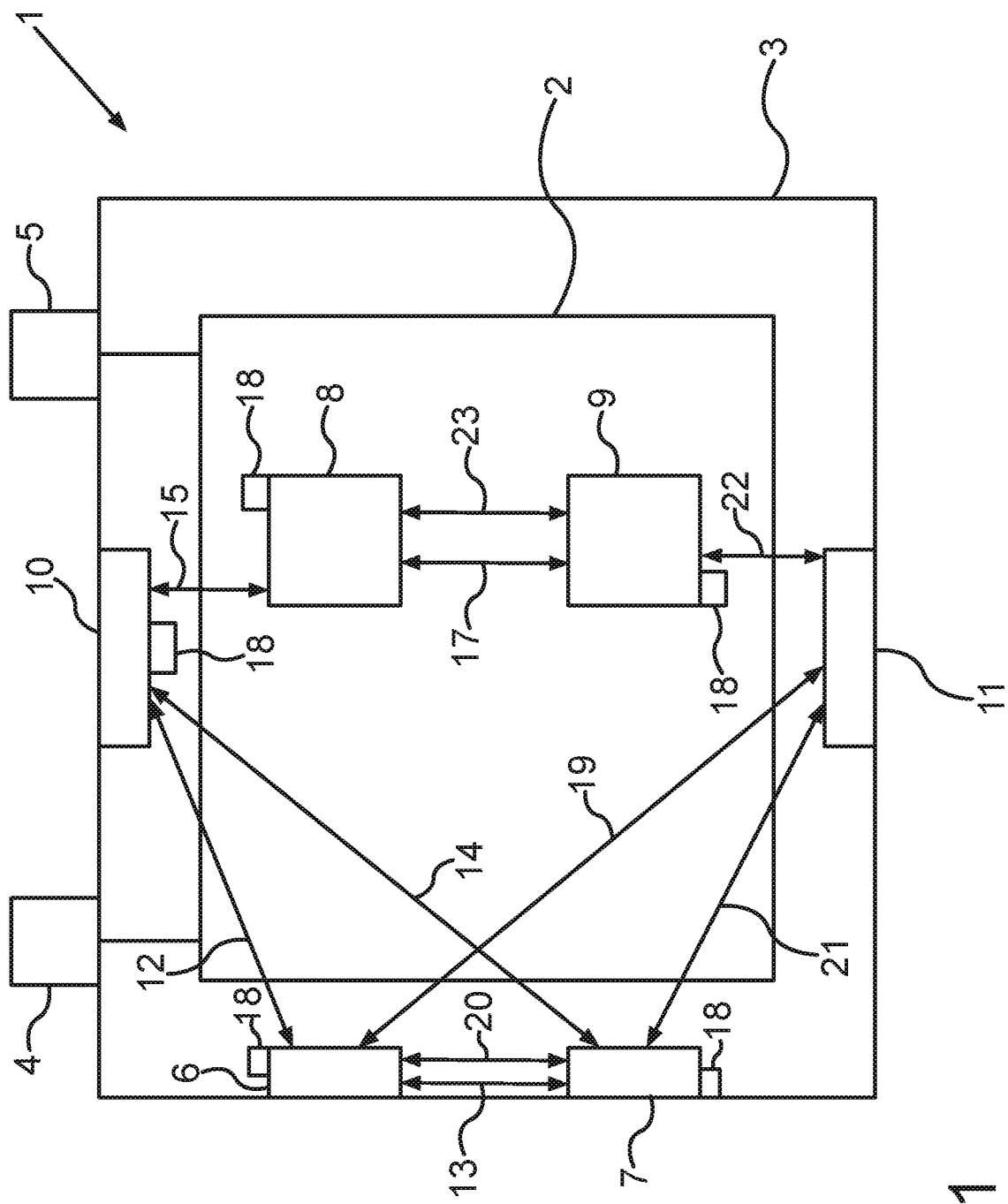
FIG. 1 a schematic representation of a battery cell in which sensor devices and a communication device of the battery cell form a mesh network.

The following embodiment described below is a preferred embodiment of the invention. However, the components described in the embodiment represent individual features of the invention which should be considered independently of each other, which further develop the features independently of each other and which should thus be also considered individually or as components of the invention in other combinations than those shown. In addition, the described embodiment can be also supplemented by other, already described features.

FIG. 1 shows a battery cell 1 with a galvanic element 2 or a battery cell wrapping as well as a battery housing 3. In this case, the galvanic element 2 is arranged in a battery cell housing 3. The battery cell housing 3 can be made for example of aluminum. The battery cell housing 3 is here provided with two exposed or raised connections 4, 5, through which electric energy can be tapped, for example to supply electric energy to an electric component. Electric energy can be also supplied to the battery cell 1 via the connections 4, 5 for charging. The battery cell 1 can be also connected through the connections 4, 5 to other similar battery cells. Such a battery can be arranged for example in a motor vehicle, not shown, to drive the motor vehicle. However, such a battery can be also provided in a stationary energy storage system, not shown.

The battery cell 1 is provided with a first sensor device 6, a second sensor device 7, a third sensor device 8 and a fourth sensor device 9. It is also possible to provide more sensor devices than the sensor devices 6, 7, 8, 9 provided in the present example. In addition, the battery cell 1 is provided with a communication device 10 and with a energy supply device 11. The spatial arrangement of the sensor devices 6, 7, 8, 9 of the communication device 10 and of the energy supply device 11 is shown here merely by way of an example. For instance, the first and the second sensor device 6, 7 are arranged in a cavity which is provided between an inner side of the wall of the battery cell housing 3 and the galvanic element 2. The third and the fourth sensor device 8, 9 are arranged inside the battery cell wrapping.

DETAILED DESCRIPTION OF THE DRAWING

Because the electrolyte, which is in particular liquid and located inside the battery cell housing 3, can accumulate in the cavities inside the battery cell housing 3, the sensor devices 6, 7, 8, 9 preferably have a chemical resistance to the electrolyte, so that the electrolyte does not cause restrictions of the functions of the sensor devices 6, 7, 8, 9 during the operation of the sensor devices 6, 7, 8, 9.

It is also possible to mount the sensor devices 6, 7, 8, 9, the communication device 10 and/or the energy supply device 11 at least partially outside of the battery cell, for example at an outer side of the wall of the battery cell housing between the connections 4, 5.

For signal exchange, the first sensor device 6 is coupled via a first signal path 112 with the communication device 10 and via a second signal path 13 with the second sensor device 7. The second sensor device 7 is coupled via a third signal path, which is formed by the first signal path 12 and the second signal path 13, and via a fourth signal path 14, to the communication device 10. The first sensor device 6, the second sensor device 7 and the communication device 10 thus form a fully meshed node, which can be formed with the sensor devices 6, 7 and the communication device 10, directly and/or via another network node.

The third sensor device 8 is coupled via a fifth signal path 15 to the communication device 10, via a sixth signal path 16 to the first sensor device 6 and via a seventh signal path 17 to the fourth sensor device 9. The signal exchange between the third sensor device 8 and the communication device 10 is in this case possible directly via the fifth signal path 15 and/or indirectly via a complete path that is formed by the sixth and the first signal path 12, 16. The communication device 10, the first sensor device 6 and the third sensor unit 8 also form here a fully meshed network. Signal exchange between the fourth sensor device 9 and the communication device 10 is here possible only indirectly via the complete path formed by the seventh and the fifth signal path 17, 15. The communication device 10, and the third and the fourth sensor device 8, 9 form here a so-called line topology.

The network topology shown here, which is formed by networking the sensor devices 6, 7, 8, 9 and the communication device 10, is described merely by way of an example. Examples of such and other topologies are shown in FIG. 2 through 8, wherein point 24 designates an example of a network node, representing for example one of the sensor devices 6, 7, 8, 9 or the communication device 10 and a connection 25 as an example of a signal path between the network nodes. FIG. 2 shows a ring topology, FIG. 3 shows a meshed topology, FIG. 4 shows a star topology, FIG. 5 shows a fully meshed topology, FIG. 6 shows a line topology, FIG. 7 a tree topology and FIG. 8 shows a bus topology. So-called hybrid topologies are also possible which are formed with a combination of two topologies.

The sensor devices 6, 7, 8, 9 can be also respectively provided with an energy conversion device 18, which is designed to convert the signal transmitted over the respective signal path 12, 13, 14, 15, 16 into electric energy to be provided to the respective sensor devices 6, 7, 8, 9. The energy conversion devices 18 are in this cases designed as so-called energy harvesting sensors. The term energy harvesting is used for obtaining small amounts of electric energy from sources such as ambient temperature, vibrations or air current. The structures used for this purpose, which is to say the energy conversion devices 18, are referred to as nanogenerators. Energy harvesting makes it possible to avoid with wireless technologies restrictions that are due to current supply with wired lines or separately by separate batteries.

Such nanogenerators can be for example piezoelectric crystals, which generate with the application of a force such as pressure, vibration or sound an electric voltage, and/or thermoelectric generators and pyroelectric crystals, which generate electric energy from temperature differences, and/or antennas, in particular passive RFIDs, which receive and utilize energetically energy from radio waves or from electromagnetic radiation, and/or sensors, which convert light based on the photoelectric effect into electric energy.

The battery cell 1 can also be provided with so-called super capacitors ("supercaps"), which are designed to store energy for a short period of time in order to provide it to the network nodes so as to supply energy. This energy can be supplied to the super capacitors of the battery cell 1 arranged in a motor vehicle, for example in a recuperation operation of the motor vehicle. Super capacitors have the advantage that they can store large amounts of energy and that they are designed for a high number of charging and discharging cycles.

The signal exchange between the sensor devices 6, 7, 8, 9 and the communication device 10 can be conducted continuously, at predetermined points in time, or only when the respective sensor devices 6, 7, 8, 9 detect a change of the sensor value, for example a change of a temperature inside the battery cell housing 3 by the sensor device 6, 7, 8, 9, which is designed as a temperature sensor. So for example, the sensor device 6, 7, 8, 9 can transmit a signal to the communication device 10 and/or another sensor device 6, 7, 8, 9 when the sensor device 6, 7, 8, 9 detects a significant change in the temperature. At the same time, the change of temperature can be used to obtain energy for example also with a very small change of the temperature occurring several times, wherein the energy conversion devices 18 are designed for example as thermoelectric generators. This energy can be for example also stored temporarily in the sensor devices 6, 7, 8, 9. For example tolerance bands can be predetermined, so that a sensor value outside of the tolerance band indicates a significant temperature change. A data transfer takes place only with a sensor value that is outside of the tolerance band, for example to the communication device 10. This makes it possible to save energy both on the side of the transmitter and on the side of the receiver.

The signal exchange can take places also inside the battery cell by means of radio waves and inductive fields. In this manner, data and the energy amounts required for the corresponding sensor device 6, 7, 8, 9 are exchanged or applied within the battery cells. At the same time, the sensor devices can be provided with passive and/or active RFID transponders and/or RFID readers, which transmit data and energy in a confined space with a small amount of energy consumption. If required, the transmitted data can be encrypted by means of an encryption method.

It can be also provided that at least one of the signal paths 12, 13, 14, 15, 16 is designed as a line, for example as an electric line or an optical fiber, and the signals can thus be transmitted through a wired connection. The signal paths 12, 13, 14, 15, 16 can be in this case designed as identical or as different signals.

However, the energy for supplying energy to sensor devices can be also provided from the energy supply device 11. For this purpose, the energy supply device 11 is here coupled via a first energy flow path 19 to the first sensor device 6. The first sensor device 6 is coupled via a second energy flow path 20 to the second sensor device 7. Therefore, the second sensor device 7 can provide the energy of the energy supply device 11 via a third energy flow path formed by the first and the second energy flow path 19, 20. Here, the second sensor device 7 is additionally coupled via a fourth energy flow path 21 to the energy supply device 11 and electric energy can be supplied through this path directly. In this case, for example the fourth sensor device 9 is coupled via a fifth energy flow path 22 to the energy supply device 11. The third sensor device 8 is coupled by the fifth energy flow path 22 and by a complete path formed by a sixth energy flow path 26 to the energy supplied device 11.

The energy supply can be provided with a wired connection, so that for a example micro-cable is provided inside the battery cell 1. For this purpose can be used for example flexible films, multi-layered films, or flexible printed circuits which can be integrated by fitting them precisely into the battery cell housing.

A stable power supply can be ensured with the network nodes and with the accompanying redundant energy flow paths, for example for supplying the first sensor device 6 via the first energy flow path 19 and/or via the third energy flow path.

The energy can be also transmitted wirelessly from the energy supply device 11. For example, energy can be obtained by means of the piezoelectric effect via the battery cell housing itself. For this purpose, the energy supply device 11 can be provided for example with a vibration actuator which deliberately generates an excitation on the battery cell housing 3. This energy can be harvested by the sensor devices 6, 7, 8, 9 which are provided with an energy harvesting sensor to convert the vibrations that are harvested or received and converted into electric energy.

In addition, the energy supply device 11 can have at least one light source, for example an LED, which emits light flashes inside the battery cell housing 3. These light flashes can be received by the sensor devices 6, 7, 8, 9 which are provided with an energy harvesting sensor for converting solar energy and converted into electric energy. These light sources can in addition be also used during so-called passive balancing or charge state adjustment of the battery cell 1. In particular, for example a charging state of the battery cell 1 can be reduced by consuming the energy of the galvanic element 2 by the light source with the emission of light flashes in order to intentionally consume or convert the energy which is supplied from the galvanic element 2.

The invention claimed is:

1. A battery cell for a battery of a motor vehicle, the battery cell comprising:
   a battery cell housing;
   a galvanic element disposed within the battery cell housing;
   at least two sensor devices, the at least two sensor devices provided within the battery cell housing of the battery cell, at least one of the at least two sensor devices provided within the galvanic element of the battery cell, the at least two sensor devices being configured to detect a feature other than an electrical output of the battery cell, each of the features that the at least two sensor devices are configured to detect being distinct from each of the other features and being at least one of a physical feature of the battery cell or a chemical feature of the battery cell; and
   a battery cell communication device disposed within the battery cell housing and configured to direct a communication outside of the battery cell, wherein the first sensor device and the battery cell communication device are coupled via a first signal path for transmitting signals between the first sensor device and the battery cell communication device and the first sensor device and the second sensor device are coupled via a second signal path for transmitting signals between the first and the second sensor device, wherein signals are configured to be exchanged between the battery cell communication device and the second sensor device via a third signal path formed by the first and by the second signal path.

2. The battery cell according to claim 1, wherein the battery cell communication device and the second sensor device are coupled via at least one fourth signal path for transmitting signals between the second sensor device and the battery cell communication device, wherein signals can be exchanged between the second sensor device and the battery cell communication device via the third signal path and via the at least one fourth signal path.

3. The battery cell according to claim 1, wherein the sensor devices and the battery cell communication device form a plurality of network nodes, each of the plurality of network nodes respectively provided with an energy conversion device, the energy conversion device of each network node in the plurality of network nodes being configured to provide electric energy from the signal transmitted from one of the other network nodes in the plurality of network nodes in such a manner as to provide energy for the respective network nodes.

4. The battery cell according to claim 1, wherein the battery cell is provided with an energy supply device for supplying energy for at least two sensor devices, wherein the first sensor device and the energy supply device are coupled via a first energy flow path for transmitting energy from the energy supply device to the first sensor device, and the first and the second sensor device are coupled via a second energy flow path for transmitting energy from the first sensor device to the second sensor device, wherein energy can be transmitted from the energy supply device to the second sensor device via a third energy flow path formed by the first and the second energy flow path.

5. The battery cell according to claim 4, wherein at least one fourth energy flow path is formed between the energy supply device and the second sensor device, wherein energy can be transmitted via the third energy flow path and via the at least one fourth energy flow path from the energy supply device to the second sensor device.

6. The battery cell according to claim 1, wherein at least one energy flow path and at least one signal path is provided with a line for wired transmission of energy and of the signals.

7. The battery cell according to claim 1, wherein at least one energy flow path and at least one signal path is configured for wireless transmission of the energy and of the signals in the form of light waves.

8. The battery cell according to claim 4, wherein the network nodes and the energy supply device are coupled with the battery cell housing in order to transmit energy and signals in the form of sound waves to the battery cell housing and to receive the sound waves transmitted from the battery cell housing.

9. The battery cell according to claim 1, wherein at least one of the at least two sensor devices is provided outside of the galvanic element of the battery cell.

10. The battery cell according to claim 1, wherein the battery cell further comprises an insulating layer originating at an inner wall of the battery cell housing and extending to the galvanic element, and wherein each of the at least two sensor devices extending further inward into the battery cell housing than an origin point of the insulating layer.

* * * * *